United States Patent [19]

Takai et al.

[11] Patent Number: 4,479,190
[45] Date of Patent: Oct. 23, 1984

[54] DETECTING APPARATUS USING A DIGITAL COMPUTER

[75] Inventors: Hiromitsu Takai, Kariya; Akira Shibata, Okazaki, both of Japan

[73] Assignee: Nippondenso Co., Ltd., Kariya, Japan

[21] Appl. No.: 329,576

[22] Filed: Dec. 10, 1981

[30] Foreign Application Priority Data

Dec. 12, 1980 [JP] Japan ............................ 55-176403

[51] Int. Cl.$^3$ ............................................. G05B 1/06
[52] U.S. Cl. ..................................... 364/556; 364/571; 364/505
[58] Field of Search ............... 364/556, 557, 558, 571, 364/150, 151, 170, 505; 340/347 CC; 219/397, 396, 413; 374/1, 193; 73/1 R

[56] References Cited

U.S. PATENT DOCUMENTS

| 4,198,676 | 4/1980 | Varnum et al. | 364/557 |
| 4,340,882 | 7/1982 | Maio et al. | 340/347 CC |
| 4,369,352 | 1/1983 | Bowles | 364/557 |

Primary Examiner—James D. Thomas
Assistant Examiner—Dale M. Shaw
Attorney, Agent, or Firm—Cushman, Darby & Cushman

[57] ABSTRACT

A detecting apparatus for compensating for changes in supply voltage to a physical parameter sensor. The apparatus includes an input element, such as a heatsensitive resistor connected to a voltage source to produce a voltage signal ($C_S$) corresponding to a physical factor, e.g., a temperature. A constant voltage circuit or a voltage divider connected to the same voltage source as the input element produces a reference voltage signal ($C_R$) corresponding to a predetermined reference value of the input element. Both voltage signals ($C_S$, $C_R$) are applied to a microcomputer in which a correction value ($C_C$) is calculated on the basis of the both voltage signals ($C_S$, $C_R$) and a theoretical set value ($C_O$) of the reference voltage signal ($C_R$). The detected physical factor by the input element is corrected by the correction value ($C_C$).

13 Claims, 4 Drawing Figures

DETECTING APPARATUS USING A DIGITAL COMPUTER

BACKGROUND OF THE INVENTION

1. Field of the Invention

The present invention relates in general to a detecting apparatus using a digital computer, and more in particularly to a detecting apparatus for rendering a control specification to coincide with a standard specification.

2. Description of the Prior Art

In a detecting apparatus using a digital computer, the resistance value of a heat-sensitive resistor or a variable resistor or the value of the electromotive force of a piezoelectric element used as an input element is provided usually as a converted value of a predetermined range of voltages, so that the A/D converted digital value of the voltage is used to determine the input condition of the digital computer thereby to control an output element. The characteristic variations of the individual elements directly affecting the voltage conversion, however, present themselves as variations of the control specification of a final product, and therefore, the variations of the control specifications are required to be held within a predetermined tolerance by preshipment adjustment.

In a widely-used method, the characteristics of the input elements, namely, the relation between the physical factors and the value of a generated voltage is adjusted within the range of the standard characteristics by use of a variable correction resistor or a pre-amplifier with the gain thereof controllable.

The greatest disadvantage of this method is that a considerable number of adjustment steps is involved.

SUMMARY OF THE INVENTION

In view of the above-mentioned fact, the object of the present invention is generally to simplify the adjusting work and to reduce the steps of the adjusting work, and specifically to provide a control system in which in order to maintain the control specification within a standard or reference range, a control digital computer has an adjusting function by a calculation based on the program thereof, thus eliminating the need of adjustment of the input element itself.

As described above, according to the present invention, there is provided a detecting apparatus comprising a reference voltage source for correction under the control of the same power supply as an input element, means for converting the voltage generated from the input element into a digital value and means for correctional calculating by use of the reference voltage from a reference voltage source. This eliminates the need of manual adjusting work thereby to greatly reduce the number of steps for producing the control system. Further, the adverse effect of such vague variable factors as the change with temperature or time can be dampened.

DESCRIPTION OF THE PREFERRED EMBODIMENTS

Figure 1:
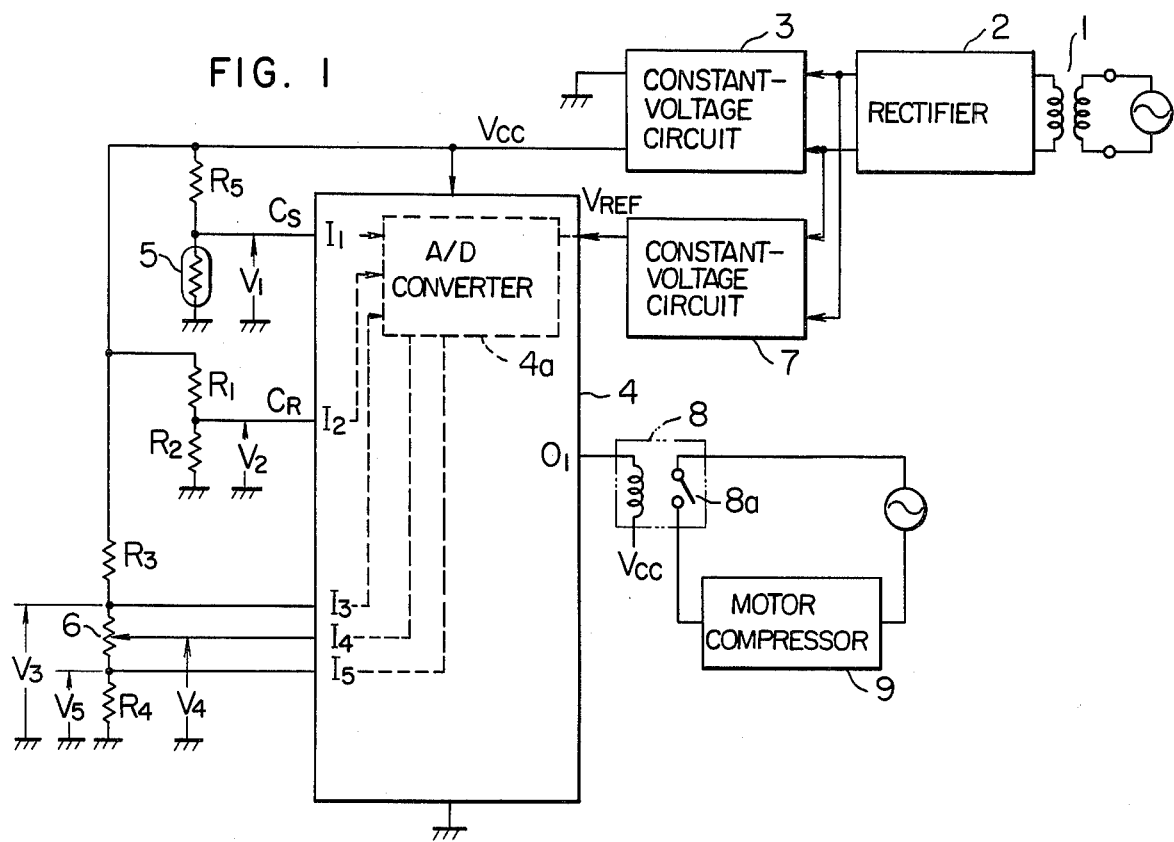
FIG. 1 is a diagram showing an electrical connection of an embodiment of the present invention.

A part of a control system for an air conditioner is shown in FIG. 1 as an embodiment of the present invention. Reference numeral 1 designates a transformer for dropping the voltage of a commercial power supply, numeral 2 a rectifier circuit using a diode bridge, and numeral 3 a constant-voltage circuit with its output source voltage expressed as Vcc. designates a microcomputer (such as M58840 of Mitsubishi Electric Corporation) includes a central processing unit (CPU) (not shown), a read-only memory (ROM) (not shown), a random access memory (RAM) not shown, and an A/D converter 4a, input ports $I_1 \ldots I_5$ and an output port $O_1$, a heat-sensitive resistor 5 for generating an analog voltage $V_1$ corresponding to the temperature of the space controlled, and a variable resistor 6 for setting a control target temperature, which applies a setting voltage $V_4$ to the input port $I_4$ of the microcomputer and the voltages $V_3$ and $V_5$ of junction points of the clamp resistors $R_3$ and $R_4$ across the variable resistor to the input ports $I_3$ and $I_5$ respectively. A constant-voltage circuit 7 is provided for generating a reference voltage $V_{REF}$ for used by A/D converter 4a in microcomputer 4 and for applying the reference voltage $V_{REF}$ to the reference voltage input terminal of the microcomputer. Reference characters $R_1$ and $R_2$ designate fixed resistors for applying the voltage $V_2$ to the input port $I_2$ for correcting the voltage produced from the heat-sensitive resistor 5. The resistance value of the fixed resistors $R_1$ and $R_2$ is selected in such a manner as to produce a voltage equal to the voltage $V_1$ of the heat-sensitive resistor 5 at a reference temperature (which is assumed to be Ts).

Numeral 8 designates an output relay connected to the output port $O_1$ of the microcomputer 4. Numeral 9 designates a motor compressor for the air-conditioner which is connected to a contact 8a of the output relay 8 and operated and stopped by the output of the microcomputer. Output elements other than the compressor will not be described.

Figure 2:
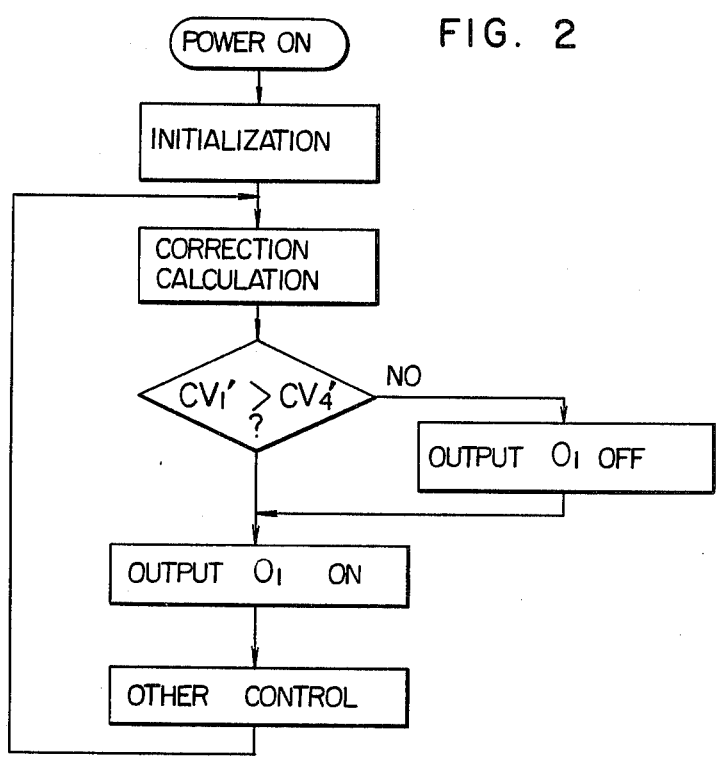
FIG. 2 is a flowchart generally showing a control program.

A flowchart generally showing a control program of the microcomputer 4 is shown in FIG. 2. The correctional calculation is always made during the execution of the program.

Figure 3:
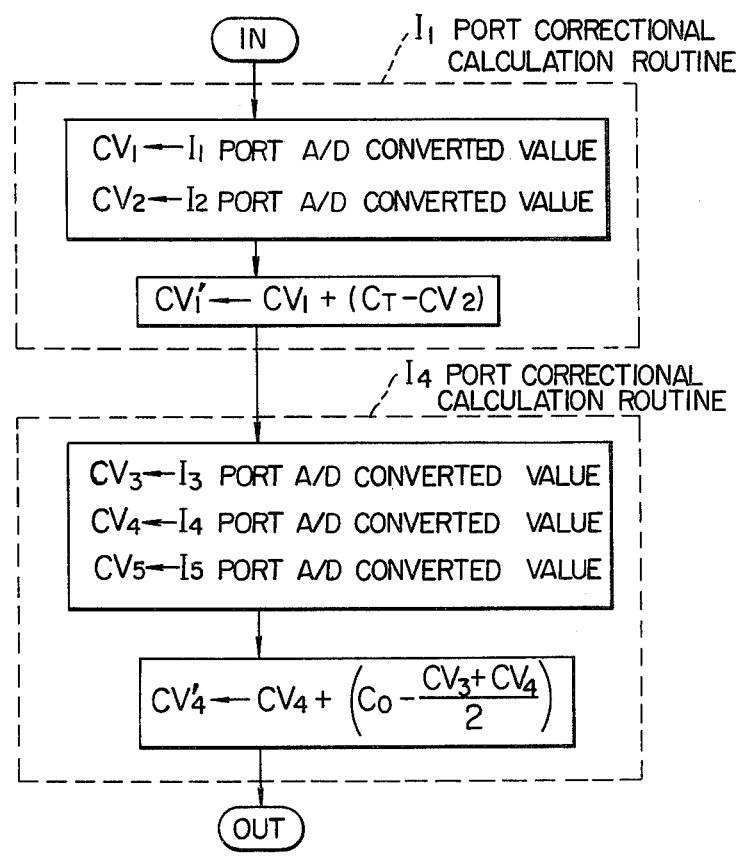
FIG. 3 is a detail flowchart of the correctional calculation routine of the control program.

A detailed flowchart of the correctional calculation program is shown in FIG. 3.

A method of adjustment will be described below with reference to the flowchart of FIG. 3. FIG. 3 corresponds to the "correction calculation" block shown in FIG. 2. In the case where the source voltage $V_{CC}$ and the reference voltage $V_{REF}$ for A/D conversion take theoretical values, the A/D converted value of the voltage $V_1$ generated at the ambient temperature of Ts of the heat-sensitive resistor 5 is assumed to be $C_T$. Generally, the temperature Ts is selected to be a middle point of the control temperature range. Assuming that the A/D converted values $CV_1$ and $CV_2$ are applied from the input ports $I_1$ and $I_2$ respectively and that the value $CV_1$ is corrected to obtain the value $CV_1'$, the correctional calculation is given by the equation (1) below.

$$CV_1' = CV_1 + (C_T - CV_2) \tag{1}$$

The values $V_{CC}$ and $V_{REF}$ are not necessarily coincident with the theoretical values thereof due to the variations of the elements involved. Thus, in the case where the value $CV_2$ is larger than the theoretical value $C_T$, the correction is made to reduce the value $CV_1'$, whereas in the case where the value $CV_2$ is smaller than $C_T$, the correction is made to increase the value $CV_1'$.

Now, let us assume that the A/D converted value of the voltage $V_1$ at the theoretical value $T_o$ of the target temperature is $C_o$ when the variable resistor 6 is set at the middle point. Also assuming that the A/D converted values of the voltages applied from the input ports $I_3$, $I_4$ and $I_5$ are $CV_3$, $CV_4$ and $CV_5$ respectively, and that the corrected value of $CV_4$ is $CV_4'$, the correctional calculation is expressed by the equation (2) below.

$$CV_4' = CV_4 + (C_o - (CV_3 + CV_5)/2 \qquad (2)$$

As in the case of the correctional calculation of the voltage $CV_1$, the correction is made to reduce the value $CV_4'$ when the value $(CV_3+CV_5)/2$ is larger than the theoretical value $C_o$, whereas the correction is made to increase the value $CV_4'$ when the value $(CV_3+CV_5)/2$ is smaller than the theoretical value $C_o$.

The theoretical values $C_T$ and $C_o$ in the abovementioned correctional calculations are defined as a constant in the program. These values are not limited to a hypothetical middle point in a control range or the middle point of a variable resistor but may be defined at an appropriate value. In this case, the voltage-dividing ratio of the resistors $R_1$ and $R_2$ may be changed or the variable $CV_2$ in equation (1) or the variable $(CV_3+CV_5)$ in equation (2) may be multiplied by an appropriate ratio (constant).

A specific calculation procedure of equations (1) and (2) above is appropriately set by a given combination of commands provided in the computer 4 and may be arranged in the significance indicated by the equations (1) and (2) respectively.

As shown in FIG. 2, the control system, namely, the air conditioner is such that in the case where the room temperature is higher than a set temperature on the basis of the value obtained by the correctional calculation, the output port $O_1$ is turned on while in the case where the room temperature is lower than the set temperature, the output port $O_1$ is turned off in order to control the compressor.

Each time the correctional calculation routine is passed, the A/D conversion is effected and a new correction value is calculated to be used for control. As a result, even under the operating conditions where the stabilization voltage $V_{CC}$ or $V_{REF}$ is changed by the change of the characteristics of the constant-voltage circuit 3 or 7 against temperature or the like, an always correct digital value of the physical quantity which should be exhibited by the input elements 5 and 6 is grasped for operation of the control system.

Figure 4:
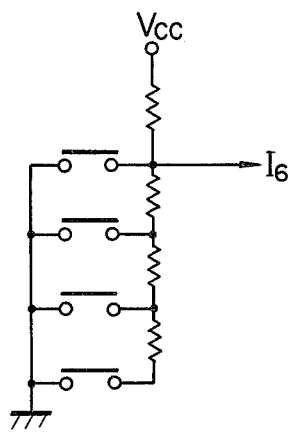
FIG. 4 is a diagram showing an electrical connection of a modification of the input element.

The aforementioned embodiment concerns the correction of temperature and a set temperature. The present invention may be further applied to the discrimination of the operating mode as shown in FIG. 4 where the operating position of an operating mode change-over switch is determined by use of a single input port $I_6$ from the difference of the divided voltage, in a manner similar to the correction shown in equation (1).

Furthermore, a similar correction is possible also in a microcomputer having an A/D converter as an external element.

The present invention may also be applied to the case where a piezoelectric element or a differential transformer is used as an input element.

We claim:

1. A detecting apparatus for generating a control output signal indicative of a physical parameter, including means for compensating for a change of supply voltage to a sensor of said physical parameter comprising:

an electric power source supplying a source voltage;
input means, connected to said electric power source and responsive to said physical parameter to be detected, for producing a first voltage signal varying in accordance with the detected physical parameter and in proportion to the source voltage supplied from said electric power source;
reference means, connected to said electric power source, for generating a second voltage signal varying in direct proportion to the source voltage but independent from changes in the detected physical factor;
control means, connected to said input means and said reference means, including analog-digital converter means for converting said first voltage signal into a first digital signal and converting said second voltage signal into a second digital signal, fixed means for providing a fixed digital signal predetermined to be equal to said second digital signal when the source voltage supplied from said electric power source is a predetermined value and compensating means for compensating said first digital signal in a direction to increase said first digital signal by an amount equal to said fixed digital signal and in a direction to decrease said first digital signal by an amount equal to said second digital signal, said control means producing a control output signal equal to the first digital signal, as compensated by said compensation means; and
an output device responsive to said control output signal from said control means.

2. An apparatus according to claim 1, wherein said input means includes a variable resistor having a charging resistance value for controlling said first voltage signal.

3. An apparatus according to claim 2, wherein said variable resistor is a heat-sensitive resistor responsive to said physical parameter.

4. An apparatus according to claim 1, wherein said reference means includes a voltage-dividing resistor arrangement.

5. A control apparatus comprising:

an electric power source for supplying a source voltage;
input means, connected to said electric power source and responsive to a physical factor to be detected, for producing a first voltage signal varying in accordance with the detected physical factor and in proportion to the source voltage;
reference means, connected to said electric power source, for generating a second voltage signal varying in direct proportion to the source voltage but independent from changes in the detected physical factor;
control means, connected to said input means and said reference means, including analog-digital converter means for converting said first voltage signal into a first digital signal and converting said second voltage signal into a second digital signal, fixed means for providing a fixed digital signal determined to be equal to said second digital signal when the voltage supplied from said electric power source is a predetermined value, varying means for providing a third digital signal varying in accordance with a desired value of said physical factor, compensating means for compensating said first digital signal in a direction to increase said first digital signal by an amount equal to said fixed digital signal and in a direction to decrease said first digital signal by an amount equal to said second digital signal, and comparing means for comparing a result of compensation of said control means with said third digital signal and producing a control output signal in accordance with the result of said comparison; and changing means responsive to said control output signal from said control means for changing said physical factor detected by said input means toward said desired value.

6. An apparatus according to claim 5, wherein said input means includes a variable resistor changing the internal resistance value thereof for controlling said first voltage signal.

7. An apparatus according to claim 6, wherein said variable resistor is a heat-sensitive resistor responsive to said physical factor.

8. An apparatus according to claim 5, wherein said reference means includes a voltage-dividing resistor arrangement.

9. An apparatus according to claim 5, wherein said variable means includes a variable resistor manipulated by a user for changing said desired value of said physical factor, said variable resistor producing a third voltage signal indicative of an amount of said said manipulation, and wherein said analog-digital converter means also converts said third voltage signal into said third digital signal.

10. An apparatus for controlling an air temperature in a compartment comprising:

an electric power source for supplying a source voltage; a temperature sensing means connected to said electric power source and responsive to said air temperature in said compartment, said temperature sensing means generating a first voltage signal varying in accordance with the sensed air temperature and in proportion to the source voltage supplied from said electric power source;

voltage-dividing means, connected to said electric power source for generating a second voltage signal varying in direct proportion to the source voltage but independent from changes in said air temperature;

temperature setting means for setting a desired temperature for said compartment and generating a third voltage signal indicative of said desired temperature;

converting means for converting said first, second, and third voltage signals into a first, second, and third digital signals, respectively;

fixed means for providing a fixed digital signal predetermined to be equal to said second digital signal when the source voltage is a predetermined value;

compensating means for compensating said first digital signal in a direction to increase said digital signal by an amount equal to said fixed digital signal and in a direction to decrease said first digital signal by an amount equal to said second digital signal;

comparing means for comparing a result of compensation of said compensating means with said third digital signal and producing a control output signal in accordance with the result of comparison;

operating means responsive to said control output signal for changing said air temperature in said compartment to decrease a difference of said sensed air temperature from said desired temperature.

11. An apparatus according to claim 10, wherein said temperature sensing means includes a serial combination of a fixed resistor and a heat-sensitive resistor changing the internal resistance value thereof in response to said air temperature.

12. An apparatus for controlling an air temperature in a compartment comprising:

an electric power source providing a source voltage;

first signal generating means, connected in series across said electric power source and including a serial combination of a first fixed resistor and a heat-sensitive resistor changing its internal resistance value in response to said air temperature, for generating a first voltage signal varying in accordance with the sensed air temperature and in proportion to the source voltage at the junction between said first fixed resistor and said heat-sensitive resistor;

second signal generating means, connected in series across said electric power source and including a voltage divider arrangement, for generating a second voltage signal varying in direct proportion to the source voltage but independent from changes in said air temperature;

third signal generating means, connected in series across said electric power source and including a serial combination of a second fixed resistor and a potentiometer having a manually adjusted contact, for generating a third voltage signal varying in accordance with the position of said contact and in proportion to the source voltage at said contact and generating a fourth voltage signal varying in direct proportion to the source voltage at the junction between said second fixed resistor and said variable resistor;

converting means for converting said first, second, third, and fourth voltage signals into a first, second, third, and fourth digital signals, respectively;

means, responsive to said fourth digital signal, for multiplying said fourth digital signal by a predetermined coefficient, said means providing a fifth digital signal indicative of the result of said multiplication;

fixed means for providing a first fixed digital signal predetermined to be equal to said second digital signal when the source voltage is a predetermined constant and for providing a second fixed digital signal equal to a predetermined value which is a product of said predetermined coefficient and said fourth digital signal provided when the source voltage is equal to said predetermined constant;

first compensating means for compensating said first digital signal in a direction to increase said first digital signal by an amount equal to said first fixed digital signal and in a direction to decrease said first digital signal by an amount equal to said second digital signal;

second compensating means for compensating said third digital signal in a direction to increase said third digital signal by an amount equal to said second fixed digital signal and in a direction to decrease said third digital signal by an amount equal to said fifth digital signal;

comparing means for comparing a result of compensation by said first compensating means with a result of said second compensating means, and producing a control output signal indicative of comparison therebetween; and operating means, responsive to said control output signal, for changing said air temperature in said compartment to decrease a difference of said sensed air temperature from said desired temperature.

13. A detecting apparatus comprising:

an electric power source providing a source voltage;

input means, connected in series across said electric power source and including a serial combination of a fixed resistor and a potentiometer having a moving output contact, for generating an input voltage signal varying in accordance with the position of said contact and in proportion to the source voltage at said contact and generating a reference voltage signal varying in direct proportion to the source voltage at the junction between said fixed resistor and said potentiometer;

converting means for converting said input voltage signal and reference voltage signal into an input digital signal and reference digital signal, respectively;

fixed means for providing a fixed digital signal equal to a predetermined value which is a product of a predetermined coefficient and said reference digital signal provided when the source voltage is a predetermined constant value;

compensating means for compensating said input digital signal in a direction to increase said input digital signal by an amount equal to said fixed digital signal and in a direction to decrease said input digital signal by an amount equal to said reference digital signal, said compensating means producing a control output signal on the basis of a result of compensation; and an output device responsive to said control output signal from said compensating means.

* * * * *